Jan. 9, 1945. C. G. OLSON 2,366,869
ASSEMBLED SCREW AND LOCK WASHER
Filed Jan. 23, 1940 2 Sheets-Sheet 1
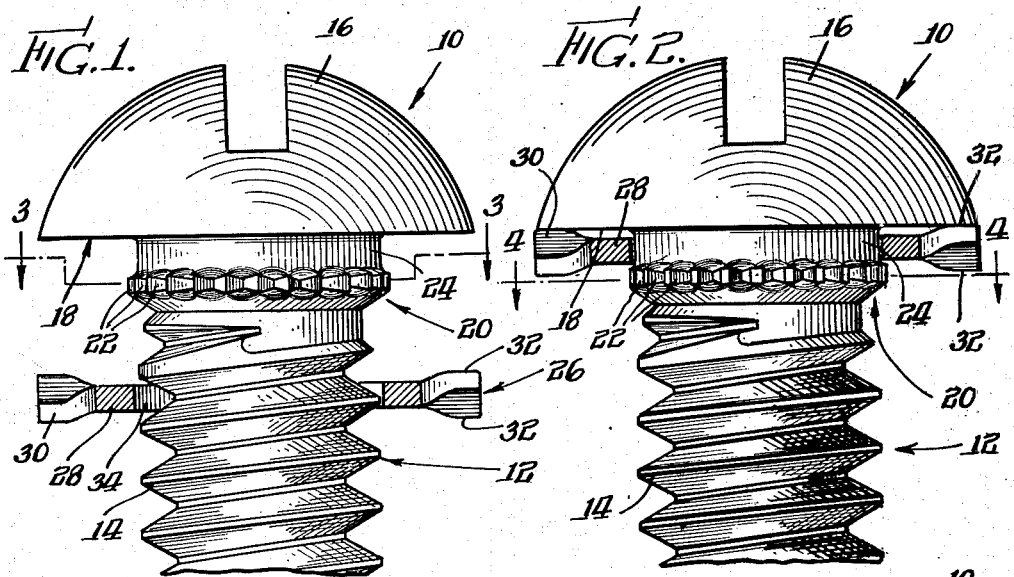
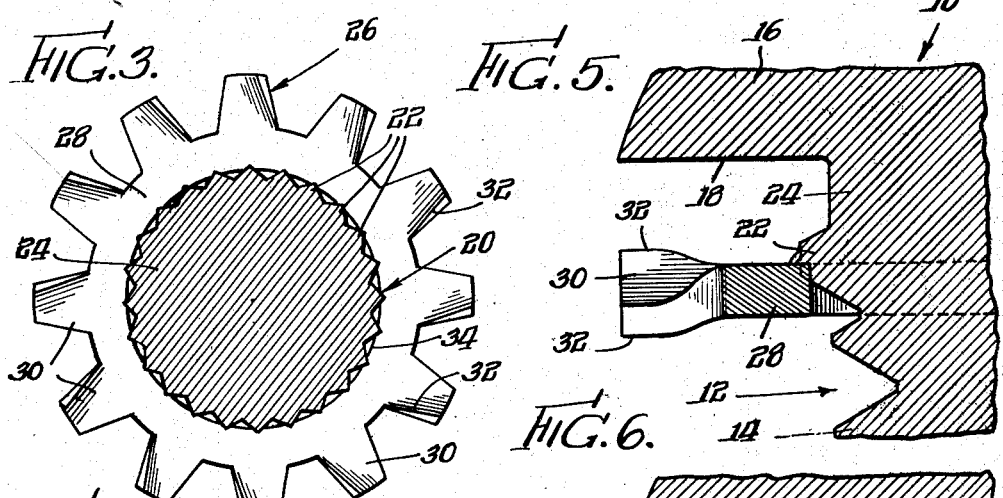
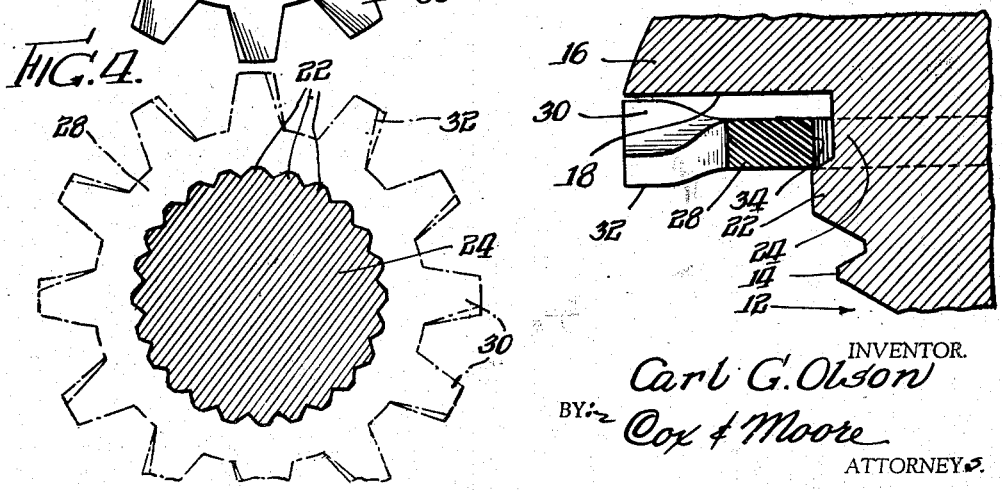
INVENTOR.
Carl G. Olson
BY Cox & Moore
ATTORNEYS.

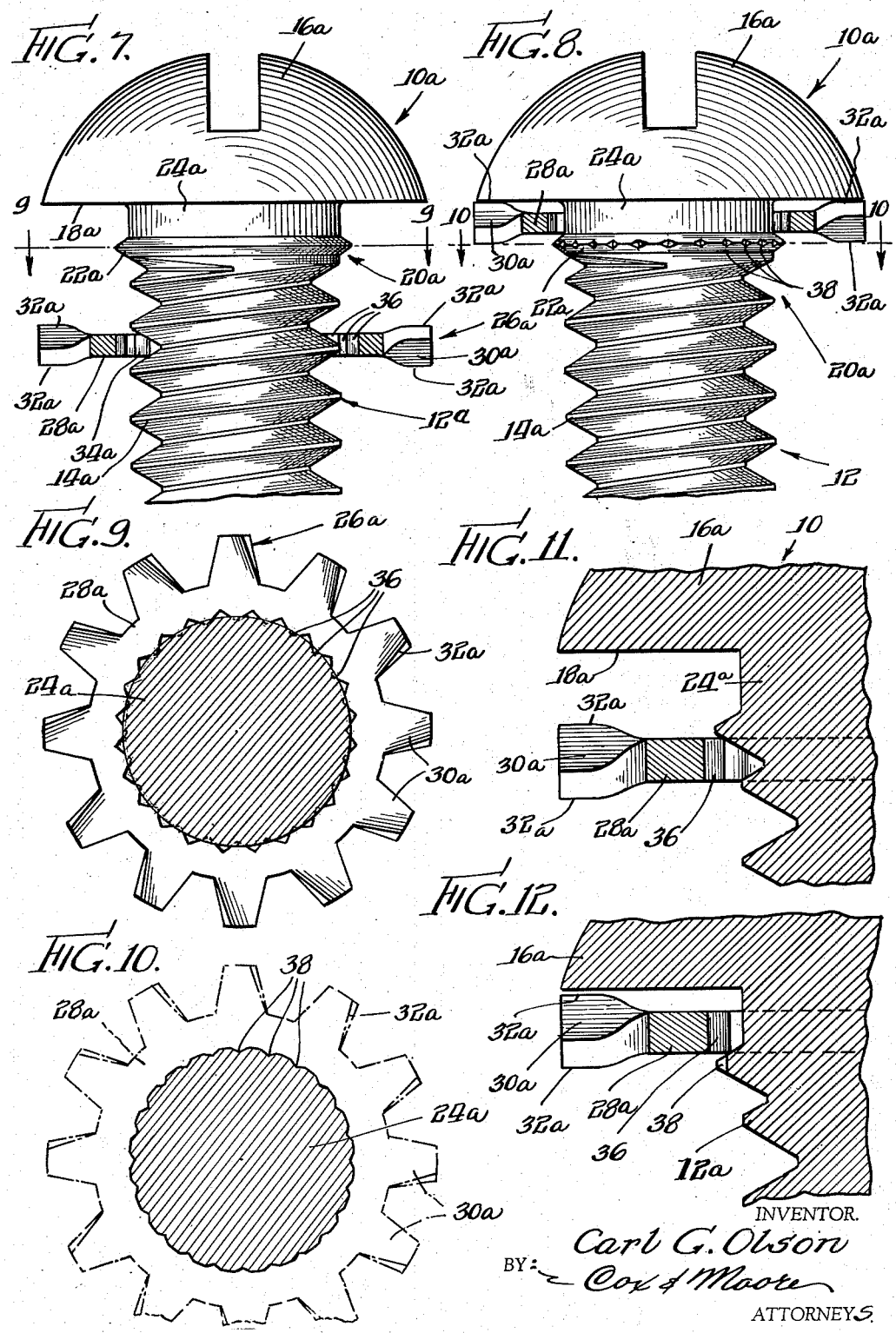

Patented Jan. 9, 1945

2,366,869

UNITED STATES PATENT OFFICE 2,366,869

ASSEMBLED SCREW AND LOCK WASHER

Carl G. Olson, Chicago, Ill., assignor to Illinois Tool Works, Chicago, Ill., a corporation of Illinois Application January 23, 1940, Serial No. 315,220

10 Claims. (Cl. 151—35)

This invention relates generally to fastener units and more particularly to fastener units of the type wherein a lock washer is preassembled beneath the clamping surface of a screw head by axially forcing the washer over a protuberance positioned in the vicinity of said head.

Experience has shown that when a continuous annular body of a lock washer is forced on to a shoulder or annular lock washer receiving section beneath the screw head, frequent breakage of the washer will result due to variations in the relative sizes of the lock washer aperture and annular lock washer receiving section or shoulder. In other words a slight under-size of the lock washer aperture or a slight over-size of the shoulder may produce an excess in frictional engagement of the parts sufficient to cause breakage of the washer body. In my United States Patent No. 2,150,126, granted March 7, 1939, I disclosed a fastener unit of a type similar to that disclosed and claimed herein, both devices being similar in that the lock washer is pressed or forced on to a plurality of circumferentially spaced protuberances which are of relatively small cross-sectional area. By providing protuberances with relatively small cross-sectional area at their outer extremities it is possible to force the lock washer stock over these protuberances by a swaging or shearing action without subjecting the washer to the possibility of breakage.

The present invention, however, constitutes an improvement in fastener units of the type referred to above in that it not only contemplates the provision of circumferentially spaced protuberances but also contemplates free rotation of the lock washer after it has been finally positioned in operative association with the clamping side of the screw head. That is to say, the invention contemplates a fastener unit wherein the lock washer is "swaged on" but is not positively secured against relative movement with respect to the screw head after final positioning therebeneath.

The invention further contemplates a fastener unit of the type set forth above wherein the lock washer stock, while sheared or swaged on to the peripheral protuberance of the screw shank, is permitted to expand slightly during the initial swaging operation and after completing the swaging or shearing operation is permitted to slightly contract and thus become secured against axial displacement by the projections over which it had previously been forced.

It is an object of the present invention to provide an improved practical fastener unit, or screw and lock washer assembly, wherein the internal diameter of the lock washer is not less than the external diameter of the threaded shank with which it is to be associated.

The foregoing and other objects and advantages will be more apparent from the following detailed description when considered in connection with the accompanying drawings, wherein—

Figure 1 is a fragmentary side elevational view disclosing a screw element of the type contemplated by the invention in association with a lock washer shown in section, just prior to the association of the lock washer with the protuberances in the vicinity of the clamping surface of the screw head;

Figure 2 is a view similar to Figure 1 disclosing the lock washer of Figure 1 secured in its final preassembled position above the peripheral protuberances and beneath the clamping surface of the screw head;

Figure 3 is a transverse sectional view taken substantially along the line 3—3 of Figure 1 to more clearly illustrate the position of the protuberances with respect to the inner margin of the lock washer body prior to the swaging or shearing action of the lock washer and the protuberances;

Figure 4 is a transverse sectional view similar to Figure 3 taken substantially along the line 4—4 of Figure 2 to more clearly illustrate the manner in which the tops of the circumferentially spaced projections are sheared or swaged by the washer stock, the lock washer being indicated by dot and dash lines;

Figure 5 is an enlarged fragmentary sectional view taken centrally of the screw showing the washer body partially swaging or shearing through the top portions of the lock washer receiving projections;

Figure 6 is a view similar to Figure 5 showing the position occupied by the lock washer after it has sheared across the projections and contracted slightly so as to slightly overlie said projections;

Figure 7 is an enlarged elevational view similar to Figure 1 of a modified arrangement wherein the teeth are provided along the inner margin of the lock washer and are capable of being swaged across an annular protuberance spaced from the clamping surface of the screw;

Figure 8 discloses the parts of Figure 7 in their final position of assembly;

Figure 9 is a horizontal transverse sectional view taken substantially along the line 9—9 of Figure 7;

Figure 10 is a horizontal transverse sectional view taken substantially along the line 10—10 of Figure 8, the lock washer being indicated by dot and dash lines.

Figure 11 is an enlarged fragmentary vertical sectional view similar to Figure 5 disclosing the lock washer of Figures 7 to 9, inclusive, partially swaged toward its final position of assembly; and Figure 12 is a similar enlarged fragmentary vertical sectional view indicating the final position of the lock washer with the inner margin slightly overlying the swaged protuberance beneath the screw head.

Referring now to the drawings more in detail wherein like numerals have been employed to designate similar parts throughout the figures, it will be seen that the fastener unit or preassembled screw and lock washer device contemplated by the present invention is designated generally by the numeral 10. The fastener unit 10 includes a screw member or element 12 having a threaded shank 14 and a head 16. The head 16 is provided at its underside with the usual clamping surface 18 which extends laterally or radially outward from a lock washer receiving section extending axially beyond said clamping surface and designated generally by the numeral 20.

The lock washer receiving section 20 is comprised of two portions, one having a plurality of circumferentially spaced protuberances or projections 22 and the other a relatively short annular surface 24 which is slightly less in external diameter than the portion provided with the teeth 22. The external diameter taken across the portion of the lock washer receiving section 20 having the teeth 22 is slightly larger than the external diameter of the threaded shank 14. Also the tops of the projections 20 are not only circumferentially spaced but are relatively small in cross-sectional area. By having this relatively small cross-sectional area, a lock washer body may be swaged or sheared across said teeth, as will presently appear, with materially greater ease.

In addition to the screw element 12, the fastener unit 10 includes a lock washer designated generally by the numeral 26. This lock washer includes an inner continuous body portion 28 and a plurality of locking teeth or prongs 30, spaced along the outer margin of the body. These prongs present oppositely disposed locking teeth or edges 32 designed to resiliently and lockingly engage the clamping surface 18 on one side and the surface of a work piece (not shown) on the other side.

The invention contemplates the method of permanently assembling the lock washer 26 in an operative position beneath the clamping surface 18 as shown by the relationship of parts in Figure 2. The inner diameter of the aperture 34 of the lock washer 26 is preferably slightly larger than the external diameter of the threaded screw shank 14 so as to permit initial telescoping of the screw and washer as illustrated in Figure 1. As the telescoping of the parts is continued the inner margin of the washer body 28 and the tops of the projections or protuberances 22 engage so as to cause said body to shear away a small top portion of the projections. This is illustrated clearly in Figure 5 wherein the initial engagement of the lock washer body and projections is shown. Obviously the material of the screw 12 is unhardened or at least softer than the material of the lock washer so that the lock washer will actually cut its way across the tops of the teeth 22. Lock washers of the type disclosed herein are usually hardened and tempered and therefore capable of being swaged without injury upon the projections 22.

Particular attention is directed to the fact that as the lock washer, which is harder than the screw, moves into engagement with the projections 22 as indicated in Figure 5 there is a tendency for the washer to experience slight radial expansion. In other words, the inner diameter of the body 28 increases slightly as said body crowds or shears its way across the tops of the teeth 22. As the washer reaches the position shown in Figure 6 and clears the tops of the projections there is a tendency for the washer body to slightly contract. Obviously if the internal diameter of the lock washer decreases only the slightest degree, it will be sufficient to render the projections 22 operative as shoulder members to secure the lock washer against axial displacement. Thus, the projections 22 will slightly underlie the body 28 as indicated in Figure 6.

Not only is the lock washer 26 secured against axial displacement after it has reached the position shown in Figure 6 but it is also free to rotate relative to the screw body. This enables relative rotation between the clamping surface of the screw head and the complementary locking teeth or edges 32 of the washer during the initial rotary clamping engagement thereof. In instances where relative rotation between the lock washer and the screw is not desired, as for example when a washer of larger external diameter than the screw head is associated with the screw, the projections 22 may be so positioned that when the washer is finally assembled beneath the clamping surface, a snug or tight fit of the washer body 28 between the clamping surface 18 and the upper portion of the projections 22 takes place.

In Figures 7 to 12, inclusive, a modified form of the invention is disclosed. The invention as previously described contemplates preforming the protuberances or projections 22 on the screw body so that when the relatively harder continuous inner margin of the washer is passed over the tops of said projections, the said tops will be sheared away. In Figures 7 to 12, inclusive, I have disclosed a fastener unit designated generally by the numeral 10a which includes a screw member 12a having a threaded screw shank 14a. The screw 12a also includes a head 16a providing a clamping surface 18a.

A peripheral lock washer receiving section extending axially beyond the clamping surface 18a is designated generally by the numeral 20a and includes an annular protuberance 22a which is separated from the clamping surface 18a by a relatively short annular portion 24a which is smaller in diameter than the diameter of the protuberance 22a.

The fastener unit 10a also includes a lock washer 26a provided with an internal annular body 28a and a plurality of external resilient locking prongs 30a providing oppositely disposed locking teeth or edges 32a. The inner margin of the lock washer is formed with a plurality of projections or teeth 36, the internal diameter of the lock washer aperture 34a defined by the inner extremities of the teeth 36 being at least as great and preferably slightly larger than the external diameter of the threaded shank 14a and slightly smaller than the external diameter of the annular protuberance 22a. When the lock washer and screw are telescoped from the position shown in Figure 7 to the position in Figure 8, the teeth 36 initially engage the annular protuberance 22a as indicated in Figure 11. That is, the tops of the teeth 36, which are of limited cross-sectional area, swage their way across the periphery of the protuberance 22a and subject the lock washer to a slight degree of expansion. As previously pointed out in connection with the disclosure in Figures 1 to 6, inclusive, the lock washer is harder than the material of the screw and hence the teeth 36 will actually cut into and serrate the protuberance 22a as indicated in Figures 8, 10 and 12. These serrations are designated by the numeral 38. When the telescoping of the parts is completed the lock washer occupies the position shown in Figure 12 with the serrated protuberance 22a slightly underlying the teeth 36 or the inner margin of the washer body 28a. This is due to the fact that after the washer has cleared the top of the annular protuberance 22a, it is free to spring inwardly a slight amount which is sufficient to secure the washer against inadvertent axial displacement. It will be noted that the protuberance or shoulder means 22a may be formed by an extrusion or rolling process contemporaneous with the rolling of the thread on the screw blank.

From the foregoing it will be apparent that my invention contemplates an improved fastener unit particularly adaptable for employing lock washers having an internal diameter at least as great as the external diameter of the screw thread. Furthermore, the arrangement of the teeth of the circumferentially spaced projections or protuberances on the screw body or lock washer is such as to facilitate initial swaging association with the lock washer and positively precludes lock washer breakage. It will be noted that the projections 22 are so designed as to enable them to be rolled or extruded upon the screw shank simultaneously with the thread rolling operation. It is also important to note that after the lock washer has been finally positioned in operative association with the clamping surface of the screw head, it does not only depend upon frictional engagement of the internal edge of the washer body with the peripheral surfaces to secure it in place, but also upon the ledge presented by the projections after the washer has sprung inwardly to a slight degree as previously explained. In some instances it may not be necessary to depend upon the contracting of the washer body after being finally positioned beneath the clamping surface. In such instances the mere pushing of the washer beyond the projections 22 (Figures 1 to 6) or the teeth 36 beyond the protuberance 22a (Figures 7 to 12) provides sufficient assurance against inadvertent axial displacement after preassembly. Obviously the invention is not limited to the use of externally toothed lock washers but contemplates internally toothed lock washers. In the event internally toothed lock washers are employed it is only necessary to so space the projections on the screw body with respect to the internal teeth of the lock washer as to insure permanent assembly after the parts have been swaged together in the manner described herein. Also the invention is not limited to any particular shape of projection beneath the washer head but contemplates various forms, shapes and sizes to accommodate the particular type of lock washer which is to form a part of the assembly. By employing the method of assembly described herein the ease and effectiveness with which lock washers may be swaged into permanently preassembled relation is greatly enhanced.

While certain structural features or embodiments have been described herein for the purpose of illustrating one practical embodiment of the invention, it will be understood that the invention is by no means limited to these specific structural features but is capable of other changes and modifications without departing from the spirit and scope of the appended claims.

Having thus described my invention, what I claim as new and desire to secure by Letters Patent is:

1. A fastener unit consisting of a headed screw having a clamping surface extending outwardly from the threaded portion of the screw, a peripheral washer receiving portion extending axially beyond said clamping surface, said washer receiving portion including a plurality of circumferentially disposed projections spaced axially from the clamping surface and a section of smaller diameter intermediate the clamping surface and said projections, and a continuous annular washer which is harder than the screw and is telescopically assembled therewith, said washer having its inner margin about said section of smaller diameter, said projections having flattened tops formed by the swaging of the projections by the washer during its assembly with the screw, and which flattened tops are of a diameter so proportioned to the internal diameter of the washer as to retain the washer against axial movement of the screw, and said section being less in diameter than the internal diameter of the washer to permit free rotation of said washer on said section.

2. A fastener unit consisting of a headed screw having a clamping surface extending outwardly from the threaded portion of the screw, a peripheral lock washer receiving portion extending axially beyond said clamping surface, said lock washer receiving portion including annularly disposed shoulder means axially spaced from the clamping surface and of greater external diameter than the portion of the screw body located between said clamping surface and said shoulder means, and a continuous annular washer which is harder than the screw and is telescopically assembled therewith, said washer having its inner margin positioned over said portion of the screw body between said clamping surface and said shoulder means so as to permit relative rotation between the washer and screw, said shoulder means being swaged by the washer to a diameter not less than the internal diameter of the washer during the telescopic assembly of the washer with the screw.

3. A fastener unit consisting of a headed screw having a clamping surface extending outwardly from the threaded portion of the screw, a peripheral lock washer receiving portion extending axially beyond said clamping surface, said lock washer receiving portion including annularly disposed shoulder means axially spaced from the clamping surface and of greater external diameter than the portion of the screw body located between said clamping surface and said shoulder means, and a continuous annular washer which is harder than the screw and is telescopically assembled therewith, said washer having its inner margin positioned over said portion of the screw body between said clamping surface and said shoulder means so as to permit relative rotation between the washer and screw and having a plurality of relatively rigid internal teeth co-planar with the body of the washer and of limited inner cross-sectional area, said internal teeth being of base diameter greater than the external diameter of said shoulder means and of internal diameter greater than said portion of the screw body, said shoulder means being swaged by said washer teeth into circumferentially spaced teeth of base diameter not less than the internal diameter of the washer teeth and of external diameter less than the base diameter of the washer teeth.

4. The method of forming a screw adapted for a screw and washer assembly which comprises rolling a helical thread on a portion of a headed blank and in the same operation rolling a continuous annular washer-retaining shoulder on the blank, the rolling of the helical thread and annular shoulder being done prior to the application of the washer to the screw and the rolled shoulder being somewhat higher than the rolled thread so that after the screw is completed a washer may be moved over the thread and shoulder and retained between the shoulder and the head of the screw.

5. The method of forming a screw adapted for a screw and washer assembly which comprises rolling a helical thread on a portion of a headed blank and in the same operation rolling a continuous annular washer-retaining shoulder at the inner end of the thread, the rolling of the helical thread and annular shoulder being done prior to the application of the washer to the screw and the rolled shoulder being somewhat higher than the rolled thread so that after the screw is completed a washer may be moved over the thread and shoulder and retained between the shoulder and the head of the screw.

6. The method of forming a screw adapted for a screw and washer assembly which comprises rolling a helical thread on a portion of a headed blank and in the same operation rolling a continuous annular washer-retaining shoulder at any desired point between the inner end of the thread and the head of the blank, the rolling of the helical thread and annular shoulder being done prior to the application of the washer to the screw and the rolled shoulder being somewhat higher than the rolled thread so that after the screw is completed a washer may be moved over the thread and shoulder and retained between the shoulder and the head of the screw.

7. The method of forming a screw from a blank having a head, a portion of reduced diameter to be threaded, and a portion of larger diameter between the first named portion and the head and adapted to be left unthreaded which comprises rolling a helical thread on the portion of reduced diameter and in the same operation forming a continuous annular shoulder on the portion of larger diameter, the rolling of the helical thread and annular shoulder being done prior to the application of the washer to the screw and said shoulder being sufficiently higher than the external diameter of the thread and of said portion of larger diameter that when a washer is passed over the thread and forced over the shoulder it will be retained by the latter between it and the head.

8. The method of making screw and washer assemblies which comprises rolling a helical thread on a headed blank and in the same operation rolling on the blank a continuous annular washer-retaining shoulder which is somewhat higher than the rolled thread, and then moving over the thread and shoulder a washer of a size to be retained on the screw between the shoulder and head thereof.

9. The method of making screw and washer assemblies which comprises rolling a helical thread on a portion of a headed blank and in the same operation rolling at the inner end of the thread a continuous annular washer-retaining shoulder which is somewhat higher than the rolled thread, and then moving over the thread and shoulder a washer of a size to be retained on the screw between the shoulder and head thereof.

10. The method of making screw and washer assemblies which comprises rolling a helical thread on a headed blank and in the same operation rolling on the blank a washer retaining shoulder which is somewhat higher than the rolled thread, and then moving over the thread and shoulder a washer of a size to be retained on the screw between the shoulder and head thereof.

CARL G. OLSON.